(12) United States Patent
Groen et al.

(10) Patent No.: US 6,439,137 B1
(45) Date of Patent: Aug. 27, 2002

(54) SELF-ANCHORING EXPANSION GAP ASSEMBLY FOR A GASIFIER

(75) Inventors: John Corwyn Groen, Fishkill; Donald Duane Brooker, Hopewell Junction, both of NY (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/810,053

(22) Filed: Mar. 16, 2001

(51) Int. Cl.$^7$ ............................... F23M 5/00; F16J 15/10
(52) U.S. Cl. ....................... 110/341; 432/242; 277/652; 110/336
(58) Field of Search ............................. 49/475.1, 498.1; 277/630, 637, 650, 652; 110/336, 337, 341; 432/59, 244, 242, 115

(56) References Cited

U.S. PATENT DOCUMENTS

| | | | |
|---|---|---|---|
| 2,895,759 A | | 7/1959 | Conrad et al. |
| 3,230,290 A | * | 1/1966 | Nelson ........................ 264/320 |
| 3,608,623 A | * | 9/1971 | Woltering ................... 164/339 |
| 3,858,891 A | | 1/1975 | Trelease |
| 3,900,282 A | | 8/1975 | Seeburger |
| 4,132,399 A | * | 1/1979 | Lechanu et al. .............. 277/47 |
| 4,219,203 A | * | 8/1980 | Bellavia et al. ............. 277/181 |
| 4,246,852 A | | 1/1981 | Werych |
| 4,454,190 A | * | 6/1984 | Katagiri ...................... 428/281 |
| 5,107,623 A | * | 4/1992 | Weil ............................. 49/485 |
| 5,209,503 A | * | 5/1993 | Heibel et al. ................ 277/229 |
| 5,250,751 A | * | 10/1993 | Yamaguchi ............ 174/35 GC |
| 5,301,595 A | | 4/1994 | Kessie |
| 5,328,667 A | | 7/1994 | Johnson |
| 5,651,554 A | | 7/1997 | Townsend |
| 5,653,450 A | * | 8/1997 | De Villepoix et al. ...... 277/164 |
| 5,917,150 A | * | 6/1999 | Hampton et al. ........ 174/50.56 |
| 6,039,325 A | | 3/2000 | Steinetz et al. |

* cited by examiner

Primary Examiner—Ira S. Lazarus
Assistant Examiner—K. B. Rinehart
(74) Attorney, Agent, or Firm—Morris N. Reinisch; Rodman & Rodman

(57) ABSTRACT

The self-anchoring expansion gap assembly for refractory lined vessels such as a gasifier includes a substantially annular insulating blanket structure formed of compressible refractory material. A coil of rope formed of relatively incompressible refractory material is positioned proximate an outer periphery of the insulating blanket structure. The expansion gap assembly is placed in an expansion gap of a gasifier, for example, such that the coil of rope aligns with an annular channel formed in the refractory lining of the gasifier at the expansion gap. Compression of the expansion gap assembly locks the coil of rope in the annular channel of the expansion gap thereby resisting vacuum pullout. The coil of rope can be formed as a single coil or a plurality of substantially concentric coils preferably from a single length of refractory rope.

21 Claims, 6 Drawing Sheets

SELF-ANCHORING EXPANSION GAP ASSEMBLY FOR A GASIFIER

BACKGROUND OF THE INVENTION

This invention relates to expansion gap assemblies for refractory lined vessels such as gasifiers and more particularly to a novel self-anchoring expansion gap assembly for a gasifier.

Partial oxidation gasifiers of the type shown in U.S. Pat. Nos. 2,809,104 and 5,484,554 are used for processing carbonaceous fuels, including coal, petroleum coke, gas and oil to produce gaseous mixtures of hydrogen and carbon monoxide, such as coal gas, synthesis gas, reducing gas and fuel gas. Typical gasifier operating temperatures can range from approximately 2200° F. to 3000° F. Operating pressures can range from 10 to 200 atmospheres.

The housing of a gasifier usually includes an outer steel shell or vessel that is lined on the inside with one or more layers of insulating and refractory material such as fire clay brick also referred to as refractory brick or refractory lining.

It is well known that refractory brick will expand as it heats up from ambient temperature to the operating temperature of the gasifier.

If no provision is made for heat expansion of the refractory lining in the gasifier there is a likelihood that the gasifier shell, which does not expand at the same rate as the refractory brick, will rupture as the brick expands. Another potential heat expansion problem is that a dome of refractory brick at an upper interior portion of the gasifier shell will bow or deflect resulting in a collapse of the refractory structure. Therefore, expansion gaps are usually provided for the refractory lining particularly at the upper interior portion of the gasifier to take up the heat expansion of the refractory brick.

The gasifiers in the previously referred to patents can operate with an annulus type feed injector such as shown in U.S. Pat. Nos. 4,443,230 and 4,491,456. The feed injector is usually located at a top portion of the gasifier, at a reduced neck opening, and serves to introduce pumpable slurries of carbonaceous fuel into the gasifier. The slurries of carbonaceous fuel are directed downwardly into a reaction chamber within the gasifier along with oxygen containing gases for partial oxidation.

To facilitate installation of the feed injector an annular flange, also referred to as a middle flange, is usually provided at the top neck opening of the gasifier. The middle flange forms a mounting surface for the feed injector. The feed injector shown in U.S. Pat. No. 5,484,559 includes a mounting flange that lies on the middle flange in an arrangement that substantially closes off the top portion of the gasifier. Such mounting arrangement of the feed injector helps maintain a pressurized environment in the gasifier.

When the feed injector is in operating position on the gasifier it extends downwardly in a centralized position from the top neck opening of the gasifier such that there is an annular space between the body portion of the feed injector and the surrounding refractory lining.

It is known to provide an expansion gap for the refractory lining above a top surface of the refractory brick at the upper interior portion of the gasifier below the top opening of the gasifier shell. This expansion gap is thus a space defined between the middle flange that supports the feed injector and the top surface of the refractory brick. However, the expansion gap exposes an inner surface of the gasifier shell which, if left unprotected, would result in overheating of the gasifier shell at the expansion gap.

In order to protect the exposed inner surface of the gasifier shell it is known to provide in the expansion gap a refractory expansion gap assembly, formed of compressible refractory insulating material. The expansion gap assembly, in uncompressed condition is normally thicker than the expansion gap, and is compressed against the top surface of the refractory brick when the middle flange is installed on the top neck portion of the gasifier.

However, during preheating procedures and gasification a vacuum condition develops in the annular space that surrounds the body of the feed injector. The vacuum condition tends to draw or pull out the expansion gap assembly away from the expansion gap in a downward direction into the reaction chamber of the gasifier. The vacuum force pullout effect on the expansion gap assembly is also referred to as vacuum pullout of the expansion gap assembly.

An unfortunate result of vacuum pullout of the expansion gap assembly is that the interior surface of the gasifier shell becomes exposed at the expansion gap and is vulnerable to overheating failure without the insulation protection provided by the refractory expansion gap assembly.

It is thus desirable to provide a self-anchoring refractory expansion gap assembly that resists vacuum pullout from the expansion gap of a gasifier.

OBJECTS AND SUMMARY OF THE INVENTION

Among the several objects of the invention may be noted the provision of a novel self-anchoring expansion gap assembly for a gasifier, a novel self-anchoring expansion gap assembly that can be locked into an expansion gap of a gasifier, a novel self-anchoring expansion gap assembly for a gasifier that includes a peripheral bulge portion that resists vacuum pullout of the expansion gap assembly, a novel self-anchoring expansion gap assembly for a gasifier that is formed of compressible and relatively incompressible refractory material, with the relatively incompressible refractory material being positioned proximate the outer periphery of the expansion gap assembly, a novel self-anchoring expansion gap assembly for a gasifier that includes compressible refractory material wrapped around relatively incompressible refractory material, a novel self-anchoring expansion gap assembly that includes compressible refractory material positioned on relatively incompressible refractory material, a self-anchoring expansion gap assembly for a gasifier that includes compressible refractory material and relatively incompressible refractory material wrapped in a sheath to form an integral package, a self-anchoring annular expansion gap assembly having compressible refractory material formed of a plurality of sectors of an annulus and folded onto a coil of relatively incompressible refractory material, a self-anchoring annular expansion gap assembly for a gasifier having a one piece compressible refractory insulating structure folded around a coil of relatively incompressible refractory material, and a novel method of preventing vacuum pullout of an expansion gap assembly from a gasifier.

Other objects and features of the invention will be in part apparent and in part pointed out hereinafter.

In accordance with the invention a self-anchoring expansion gap assembly for a gasifier includes a substantially annular insulating blanket structure formed of compressible refractory material and a coil of relatively incompressible refractory rope positioned proximate the outer periphery of the insulating blanket.

The expansion gap assembly is disposed in an annular expansion gap of a gasifier which expansion gap includes an annular peripheral channel. The coil of refractory rope of the expansion gap assembly is thus receivable and lockable in the annular channel of the expansion gap.

Under this arrangement the coil of rope and the insulating blanket structure can receive an axial compression force such that the coil of rope and a portion of the insulating blanket are forced into the annular channel of the expansion gap to thereby lock the expansion gap assembly into the annular channel. The locking in of the compressible refractory blanket structure and the relatively incompressible refractory rope in the annular channel prevents the expansion gap assembly from being pulled away from the expansion gap of the gasifier.

In some embodiments of the invention the expansion gap assembly includes a compressible annular refractory portion that is composed of a plurality of sectors of an annulus. The sectors of compressible refractory insulating material are folded around a one piece coil of the refractory rope.

The compressible refractory insulating material can be a laminate of two different insulating materials. Preferably one compressible layer is formed of a ceramic refractory blanket and the other compressible layer can be formed of ceramic paper or ceramic cloth.

In one embodiment of the invention the ceramic paper or cloth layer constitutes the inside layer of the folded laminate and thus makes direct contact with the refractory rope.

In other embodiments of the invention the ceramic paper or ceramic cloth constitutes the outside layer material of the folded laminate. Thus the ceramic refractory blanket makes direct contact with the refractory rope. In another embodiment of the invention the expansion gap assembly includes an annular sheath of stainless steel mesh to form an integral package that can be installed as a unit.

In some embodiments of the invention the coil of refractory rope is wound into a single coil. In other embodiments of the invention the coil of refractory rope can be wound into a double coil or a triple coil as desired.

In a further embodiment of the invention the compressible insulating blanket structure can comprise a single non-folded layer of refractory material placed on a coil of rope and wrapped in an inner annular sheath of ceramic cloth and an outer annular sheath of a high temperature metal alloy such as stainless steel mesh or Inconel® mesh to form an integral package that can be installed as a unit.

In another embodiment of the invention the expansion gap assembly can be formed of one piece compressible refractory layers that are folded around a coil of rope. This embodiment can also, if desired, be surrounded by an inner annular sheath of ceramic cloth and an outer annular sheath of a high temperature metal alloy such as stainless steel mesh or Inconel® mesh.

In all embodiments of the invention the self-anchoring expansion gap assembly is thicker, when compressed, than the expansion gap and includes a peripheral bulge portion that aligns with an annular channel of a gasifier. The peripheral bulge portion includes a peripheral portion of the compressible refractory blanket structure and the relatively incompressible refractory rope.

The middle flange, when positioned on the gasifier, covers the expansion gap and compresses the expansion gap assembly. The peripheral bulge portion of the expansion gap assembly is thus forced into the annular channel of the expansion gap to lock the expansion gap assembly in position. Locking in of the expansion gap assembly prevents it from being subject to vacuum pullout when the gasifier is in operation.

The invention further includes a method of preventing vacuum pullout of an expansion gap assembly. The method includes providing an annular groove in the refractory brick lining of the gasifier shell at an upper portion of the gasifier and forming a self-anchoring expansion gap assembly as previously described. The method further includes positioning the expansion gap assembly such that the coil of refractory rope is aligned with the annular groove of the gasifier and compressing the expansion gap assembly to lock the peripheral bulge portion of the expansion gap assembly, including the coil of rope into the annular groove.

The method further includes forming the annular compressible blanket portion of the expansion gap assembly of substantially radial sectors of an annulus.

The invention accordingly comprises the constructions and methods hereinafter described, the scope of the invention being indicated in the claims.

DESCRIPTION OF THE DRAWINGS

In the drawings.

Corresponding reference characters indicate corresponding parts throughout the several views of the drawings.

DETAILED DESCRIPTION OF THE INVENTION

Figure 1:
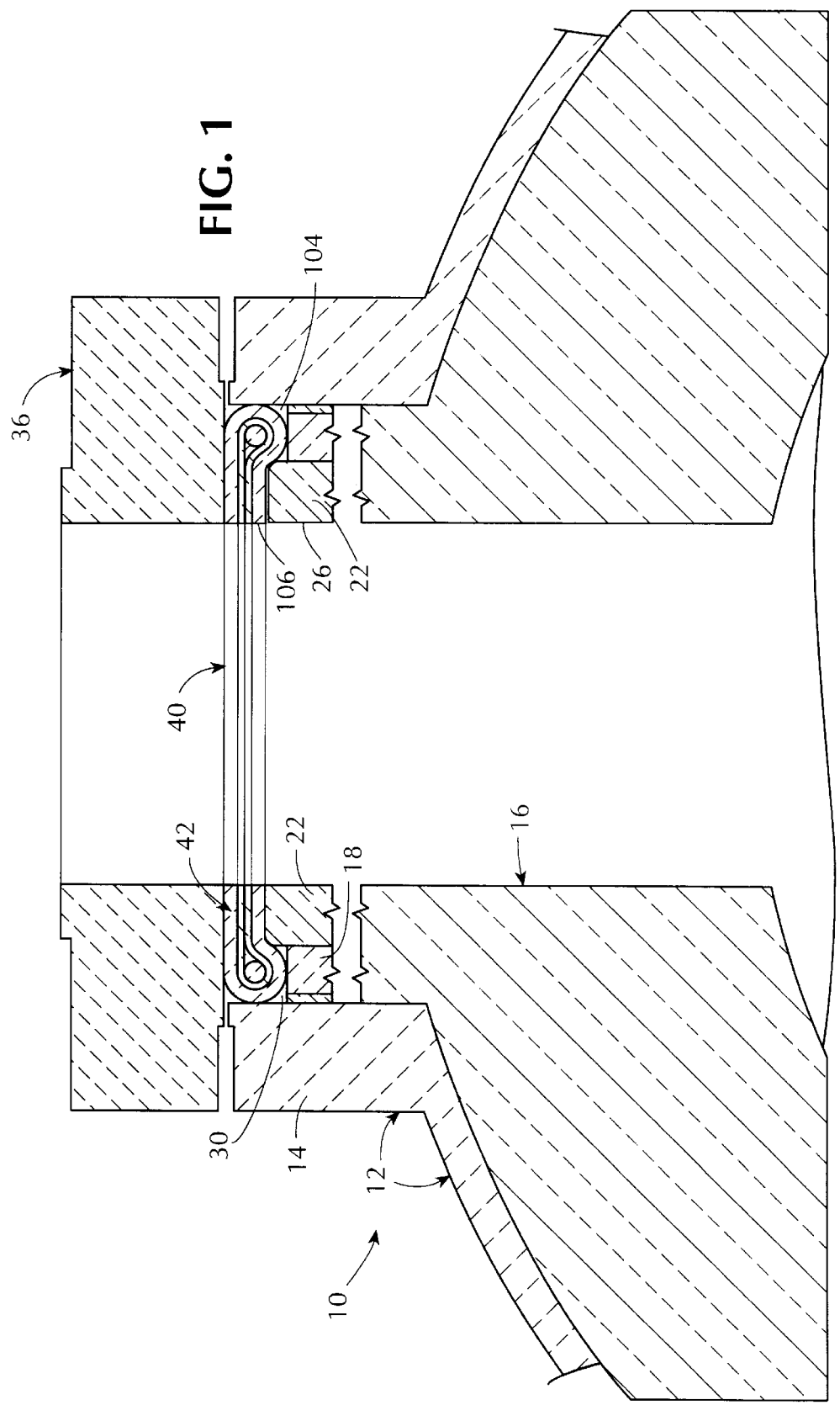
FIG. 1 is a simplified fragmentary sectional view of the upper portion of a gasifier incorporating one embodiment of the self-anchoring expansion gap assembly invention.
Figure 6:
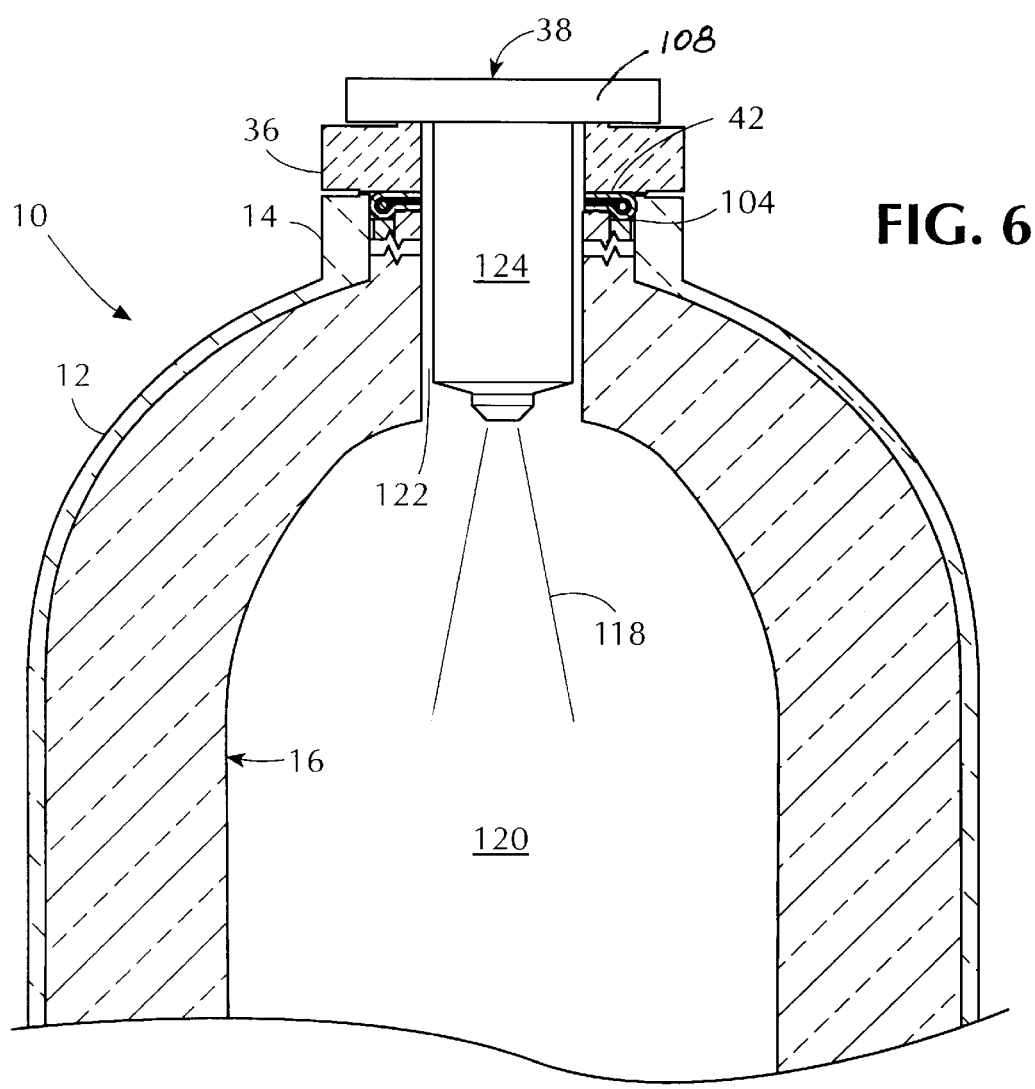
FIG. 6 is a simplified sectional view of the gasifier with a feed injector installed on a middle flange and the self-anchoring expansion gap assembly anchored in position between the middle flange and the upper portion of the gasifier.

Referring to the drawings, especially FIGS. 1 and 6, a gasifier is generally indicated by the reference number 10.

The gasifier 10 includes an outer steel vessel or shell 12 having a top neck portion 14. The interior surface of the gasifier shell has a refractory lining 16 that includes a backup lining of refractory brick 18 with a top surface 20. Although the description refers to a backup lining of refractory brick 18 the backup lining can also be made of any suitable known pourable castable refractory material. The refractory lining 16 also includes an adjacent layer of hot face brick 22 with a top surface 24 (FIG. 2), a hot face 26 and a rounded or beveled corner 28.

The top surface 20 of the backup brick 18 is recessed below the top surface 24 of the hot face brick 22 to define an annular channel 30. The backup brick surface 20 is thus the floor of the annular channel 30. The channel 30 can have a recess depth of approximately 25 millimeters, for example, as measured from the hot face brick surface 24 to the backup brick surface 20 and a recess width of approximately 75 to 160 millimeters as measured from a back surface 29 of the hot face brick 22 to the interior surface of the shell 12.

As most clearly shown in FIG. 2 the top surfaces 20 and 24 of the backup brick 18 and the hot face brick 22 are recessed below a top edge 32 of the gasifier neck 14 to allow for expansion of the refractory lining 16 when it heats up during operation of the gasifier 10. An interior surface portion 34 (FIG. 2) of the gasifier shell 12 is thus exposed near the top edge 32 of the gasifier neck 14.

An annular middle flange 36 (FIG. 2) is disposed on the top edge 32 of the gasifier neck 14 to provide a mounting surface for a feed injector 38 (FIG. 6). The space between the middle flange 36 and the top surfaces 20 and 24 of the backup brick 18 and the hot face brick 22 is referred to as an expansion gap 40 (FIG. 2). The expansion gap 40 can have a height of approximately 75 millimeters between the backup brick surface 20 and the middle flange 36, and a height of approximately 50 millimeters between the hot face brick surface 24 and the middle flange 36, although these height dimensions are a function of the overall size of the gasifier.

The exposed interior shell portion 34 of the gasifier 10 and a lower surface portion 37 (FIG. 2) of the middle flange 36 are protected from direct exposure to thermal conditions and chemical reactions in the gasifier by a self-anchoring expansion gap assembly 42 that incorporates one embodiment of the invention.

Figure 2:
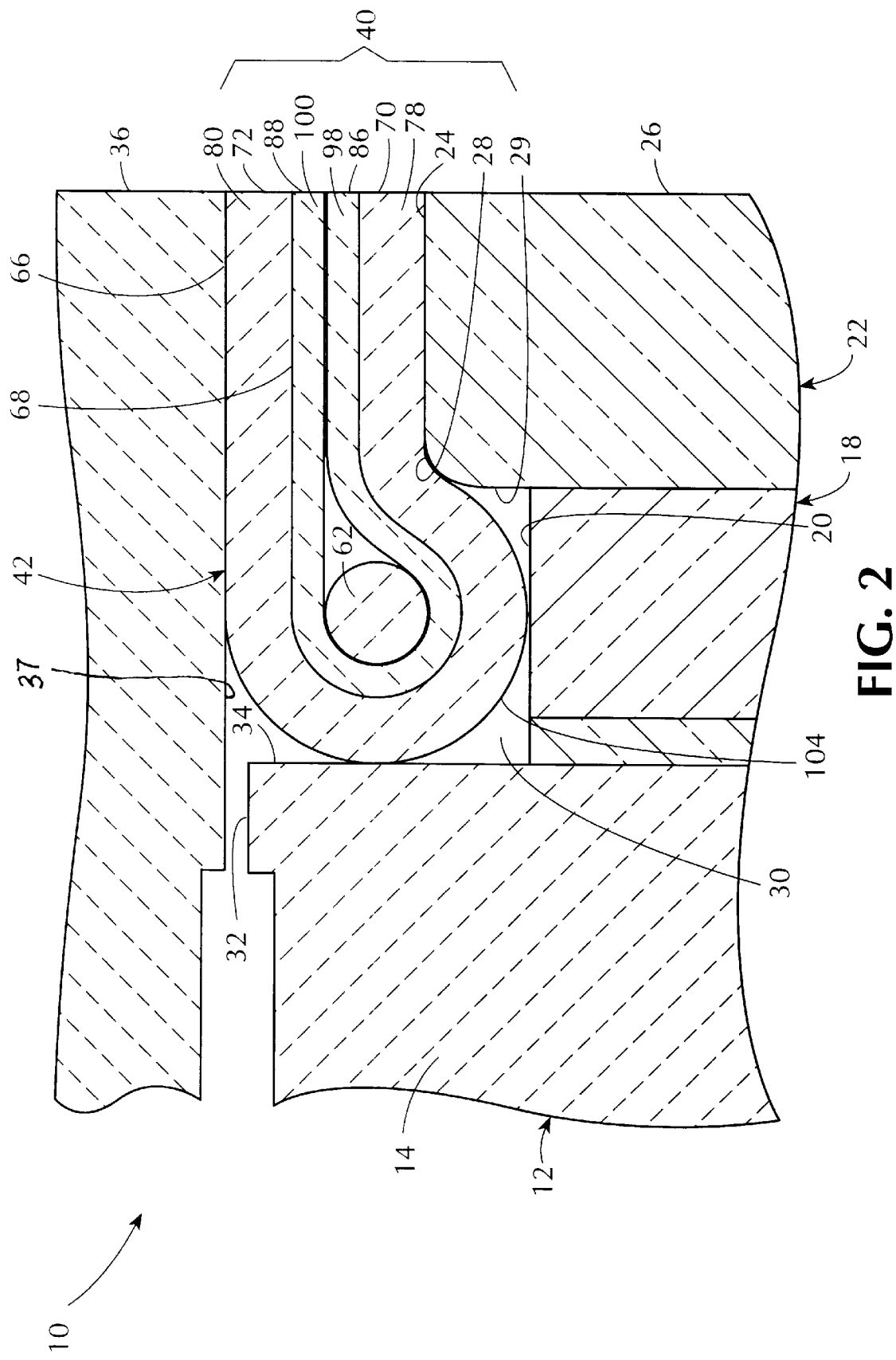
FIG. 2 is an enlarged fragmentary sectional view thereof.
Figure 4:
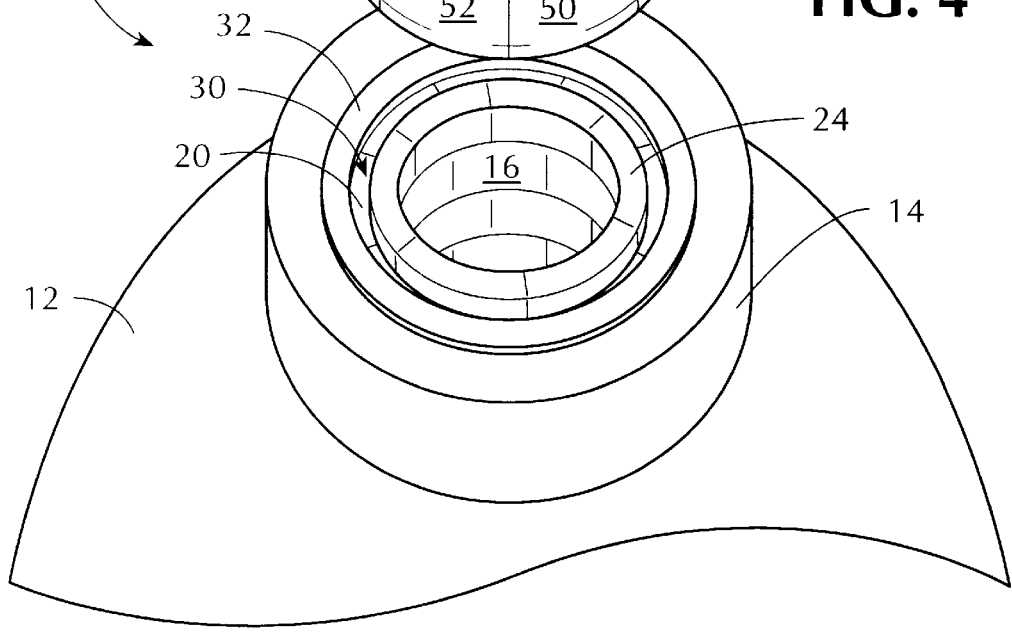
FIG. 4 is a view similar to FIG. 3 with the expansion gap assembly exploded from the gasifier in partially unfolded condition.
Figure 5:
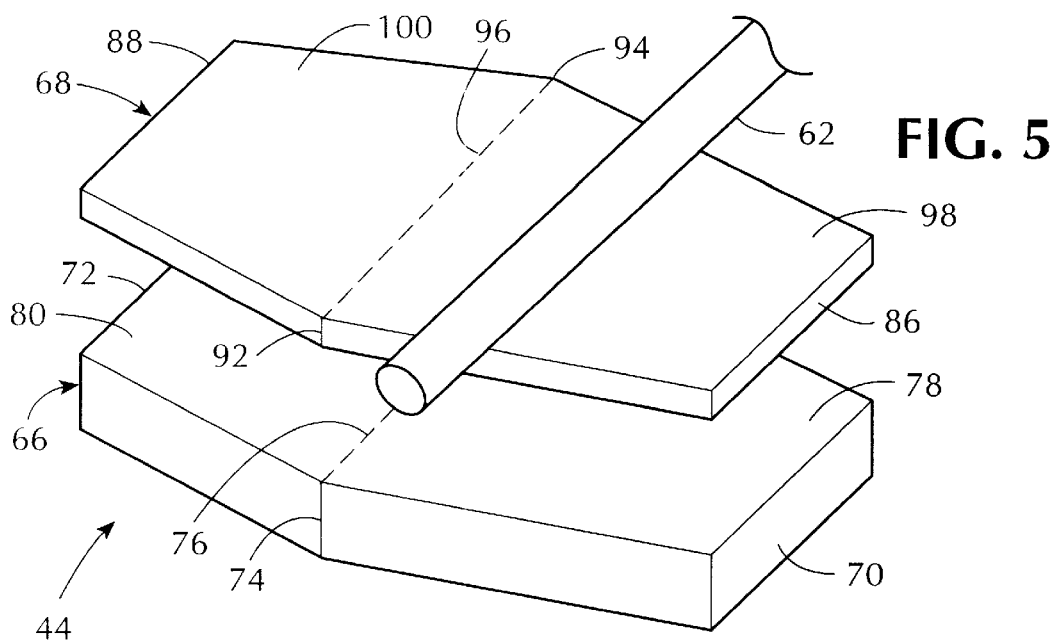
FIG. 5 is a simplified perspective view, in unfolded condition, of one of a plurality of sectors of the expansion gap assembly shown in FIGS. 3 and 4.

Referring to FIGS. 4 and 5 the expansion gap assembly 42 is in the form of an annulus and includes eight substantially equal sectors of an annulus 44, 46, 48, 50, 52, 54, 56 and 58 of folded compressible refractory insulating structure wrapped around a full coil of a known relatively incompressible refractory rope 62 (FIGS. 2 and 4). The coil of rope 62 is formed from a length of rope arranged in circular form such that the opposite ends of the rope substantially abut.

Referring to FIG. 5 a typical sector, such as the sector 44, is shown in unfolded condition, and includes an outside compressible layer 66 and an inside compressible layer 68. The outside layer 66 can be formed of any high temperature rated compressible material preferably capable of withstanding temperatures in excess of 2800° F., such as for example, high temperature rated and preferably high alumina content ceramic fiber material such as that sold under the designation Saffil™ blanket by Saffil Ltd of Cheshire, UK. The outside layer 66 can be, for example, approximately 25 millimeters thick in uncompressed form. The inside layer 68 can be formed of any high temperature rated compressible material preferably capable of withstanding temperatures in excess of 2800° F., such as for example, high temperature rated ceramic paper or ceramic cloth of the type sold by the Carborundum Co. under the designation Fiberfrax®. The inside layer 68 can be, for example, approximately 7 millimeters thick in uncompressed form. Since ceramic paper and ceramic cloth are commercially available in relatively thin gauges more than one layer of ceramic paper and ceramic cloth can be used as desired to form the desired thickness of the inside layer 68.

Although the size of the layers 66 and 68 would depend upon the size of the expansion gap 40 some dimensional examples compatible with dimensions previously given for the expansion gap 40 include an outside layer 66 having an overall length of approximately 365 millimeters between opposite base ends 70 and 72 and an overall width of approximately 290 millimeters between a side peak 74 and a corresponding opposite side peak (not shown). The outside layer 66 is folded along an imaginary line 76 joining the opposite side peaks, such as 74, to form a lower folded portion 78 and an upper folded portion 80.

The terms "lower" and "upper" refer to the positioning of the lower and upper folded portions 78 and 80 in the expansion gap assembly 42 such as shown in FIG. 2. Opposite base ends 70 and 72 of the outside layer 66 can be approximately 175 millimeters wide.

The lower folded portion 78 of the outside layer 66 can have a length from the base end 70 to the fold line 76 of approximately 196 millimeters. The upper folded portion 80 of the outside layer 66 can have a length of approximately 170 millimeters from the base end 72 to the fold line 76. Thus the lower folded portion 78 of the outside layer 66 is slightly longer than the upper folded portion 80 because it traverses a longer path than the upper portion 80. The lower portion 78 passes into the annular channel 30 while the upper portion 80 passes over the annular channel 30, as shown in FIG. 2.

Some dimensional examples for the inside layer 68 (FIG. 5) include an overall length of approximately 320 millimeters between opposite base ends 86 and 88, and an overall width between opposite side peak portions 92 and 94 of approximately 280 millimeters. The inside layer 68 is folded along an imaginary line 96 joining the opposite side peaks 92 and 94 to form a lower folded portion 98 and an upper folded portion 100. The width of each of the base ends 86 and 88 can be approximately 175 millimeters. The distance between the base end 86 and the fold line 96 can be approximately 175 millimeters. The distance between the base end 88 and the fold line 96 can be approximately 140 millimeters.

Thus the lower folded portion 98 of the inside layer 68 is slightly longer than the upper folded portion 100 of the inside layer 68 because the folded portion 98 traverses a path into the annular channel 30, whereas the upper folded portion 100 passes over the annular channel 30. The refractory rope 62 can have a cross sectional diameter of approximately 25 millimeters corresponding to the recess depth of the channel 30.

Figure 3:
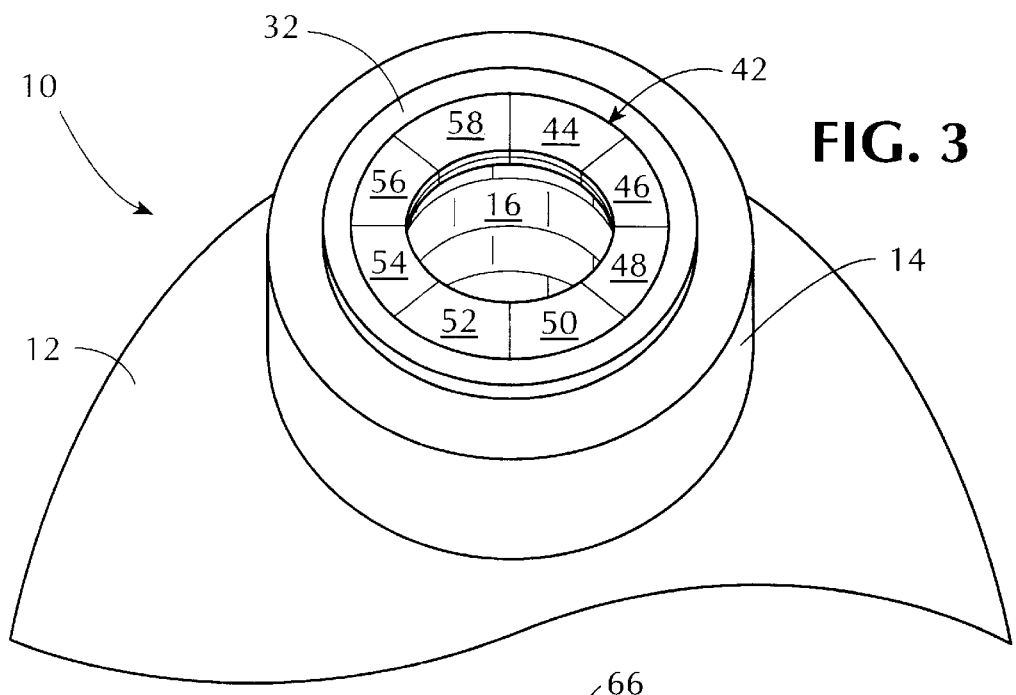
FIG. 3 is a simplified top perspective view thereof.

The expansion gap assembly 42 can be assembled by folding each of the sectors 44–58 around the coil of refractory rope 62 as shown in FIGS. 2 and 3 after the sectors 44–58 are located on the top surfaces 20 and 24 and are disposed in the annular channel 30. For example, the sector 44 is assembled by placing the inside layer 68 on top of the outside layer 66 in the manner shown in FIG. 5. The lower folded portion 98 and the upper folded portion 100 of the inside layer 68 thus lie against the corresponding lower folded portion 78 and upper portion 80 of the outside layer 66. The additional sectors 46–58 are assembled in a manner similar to that previously described for the sector 44. The sectors 44–58 are preferably placed on the top surfaces 20 and 24 and are positioned in the annular channel 30 before the ceramic rope 62 is installed.

The ceramic rope 62 is positioned on the lower folded portion 98 of the inside layer 68 of each sector 44–58 adjacent the fold line 96 and is bonded to the inside layer 68 with any suitable refractory adhesive. The upper folded portion 100 of the inside layer 68 and the upper folded portion 80 of the outside layer 66 of each sector 44–58 thus sandwich the coil of rope 62 between the folded over layers 66 and 68 as shown in FIG. 2.

Assembly of the expansion gap assembly 42, as described, can be completed on site at the gasifier 10.

The expansion gap assembly 42 thus includes an axial bulge 104 (FIG. 2) at its outer periphery, also referred to as the peripheral bulge portion 104. The peripheral bulge portion 104 is attributable to the relatively incompressible refractory rope 62 being sandwiched between the folded over compressible inside and outside layers 68 and 66, thereby causing the inside and outside layers 68 and 66 to bulge at the outer peripheral portion of expansion gap assembly 42.

The expansion gap assembly 42, when installed in the gasifier 10, has the peripheral bulge portion 104 positioned in the annular channel 30 with the lower folded portion 78 of the outside layer 66 lying against the top surface 24 of the hot face brick 22. An inner peripheral edge 106 (FIG. 1) of the expansion gap assembly 42 can be trimmed to align with the hot face 26 of the hot face brick layer 22 or the inner peripheral edge 106 can be trimmed to extend slightly beyond the hot face 26 by approximately 30 to 40 millimeters to help shield the middle flange 36 and a mounting flange 108 of the feed injector 38 from radiant heat.

When the expansion gap assembly 42 is disposed in the expansion gap 40 as shown in FIGS. 1 and 2 the middle flange 36 is fastened to the top edge portion 32 of the gasifier 10, as shown in FIG. 1, in any suitable known manner. The uncompressed height of the peripheral bulge portion 104 of the expansion gap assembly 40 can be approximately 100 millimeters based on previous dimensional examples and the distance between the top surface 20 (the floor of the annular channel 30) and the middle flange 36 can be approximately 75 millimeters. The middle flange 36 axially compresses the expansion gap assembly 42 and forces the peripheral bulge portion 104 to remain locked in the annular channel 30. The expansion gap assembly 42 is thus anchored in the expansion gap 40.

The middle flange 36 also compresses the sectors 44-58 against the top surface 24 of the hot face brick 22. After the middle flange 36 is installed the feed injector 38 (FIG. 6) is positioned on and fixed to the middle flange 36 in a suitable known manner.

When the gasifier 10 is operational the feed injector 38 introduces pumpable slurries of carbonaceous fuel 118 (FIG. 6) into a reaction chamber 120 of the gasifier. During a startup operation of the gasifier 10 and before the feed injector is installed a preheat burner (not shown) aspirates large volumes of air through an annular space between the preheat burner and the refractory lining 16, thereby creating a venturi effect in the annular space that results in a vacuum pullout force imposed on the expansion gap assembly 42.

A similar venturi effect is caused during operation of the feed injector 38 resulting in a vacuum pullout force being developed in an annular space 122 between a body portion 124 of the feed injector 38 and the refractory lining 16. However, the combination of the relatively incompressible ceramic rope 62 sandwiched between the compressible sectors 44-58 enable the peripheral bulge portion 104 of the expansion gap assembly 42 to be locked into the annular channel 30 thereby preventing vacuum pullout of the expansion gap assembly 42 during preheating of the gasifier 10 and during normal operation of the gasifier 10.

Figure 9:
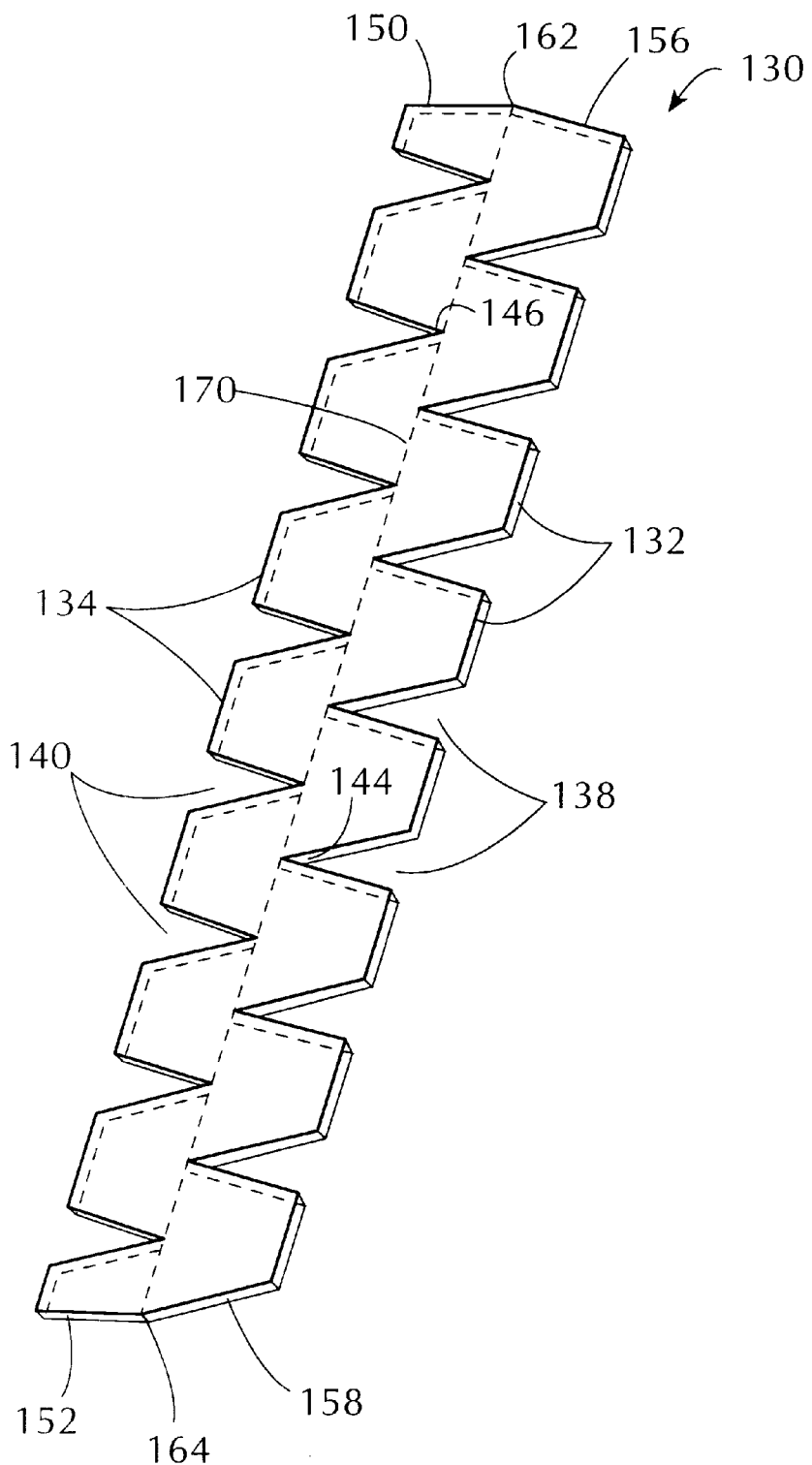
FIG. 9 is a simplified schematic development of a one piece insulating blanket construction for the self-anchoring expansion gap assembly for a gasifier.

In another embodiment of the invention all of the outer layers 66 of each of the sectors 44-58 of compressible refractory insulating material are formed from a one piece outer layer 130 of compressible refractory insulating material as shown in FIG. 9.

The one piece outer layer 130 includes opposite elongated sides 132 and 134 respectively interrupted by equally spaced angular recesses 138 and 140. The vertices 144 of the angular recesses 138 are located halfway between the vertices 146 of the angular recesses 140. The vertices 146 of the angular recesses 140 are located halfway between the vertices 144 of the angular recesses 138.

The outer layer 130 further includes opposite parallel end portions 150 and 152 that respectively intersect with beveled edges 156 and 158 at respective peak portions 162 and 164. The beveled edges 156 and 158 define angles that cumulatively equal the angular magnitude of an angular recess 138.

The vertices 144 and 146 lie along an imaginary fold line 170 connecting the peak portions 162 and 164. The portion of the layer 130 from the side 132 up to the line 170 represents the lower folded portion of the layer 130 and the portion of the layer 130 from the line 170 to the side 134 represents the upper folded portion of the layer 130.

The outer layer 130 can be folded along the line 170 such that the elongated sides 132 and 134 substantially overlap (not shown). The folded layer 130 can then be formed into an annulus (not shown) having an inner periphery defined at the overlapping elongated sides 132 and 134. An outer periphery of the annulus is defined at the fold 170.

Some dimensional examples for the layer 130 include a nominal uncompressed thickness of approximately 25 millimeters, an overall length of approximately 2320 millimeters from the end 150 to the end 152, and a width of approximately 360 millimeters from the side 132 to the side 134. The distance between the side 132 and the line 170 can be approximately 195 millimeters and the distance between the line 170 and the side 134 can be approximately 165 millimeters. The angular recesses 138 can define an angle of approximately 33° and the angular recesses 140 can define an angle of approximately 38°. The beveled edges 156 and 158 can each define an angle of approximately 16.5°.

The distance between the end 150 and the closest vertex 144 can be approximately 290 millimeters.

Although not shown, a one piece inner layer corresponding to all of the inner layers 68 of the sectors 44-58 can be formed in a manner similar to the outer layer 130. The one piece inner layer (not shown) and the one piece outer layer 130 are placed upon each other in a manner similar to that shown for the sector 44 in FIG. 5. The layers are then folded around a length of ceramic rope (not shown) similar to the rope 62 and having a length substantially corresponding to the overall length of the layer 130.

The folded over layers including the layer 130 are then formed into an annulus (not shown) wherein the opposite ends such as 138 and 140 abut and the overlapping elongated sides such as 132 and 134 define the inner circular periphery of an annulus while the outer circular periphery of the annulus is defined at the fold line 170. The expansion gap assembly resulting from use of one piece layers such as the layer 130 would then be installed in a gasifier in a manner similar to that described for the expansion gap assembly 42.

Figure 7:
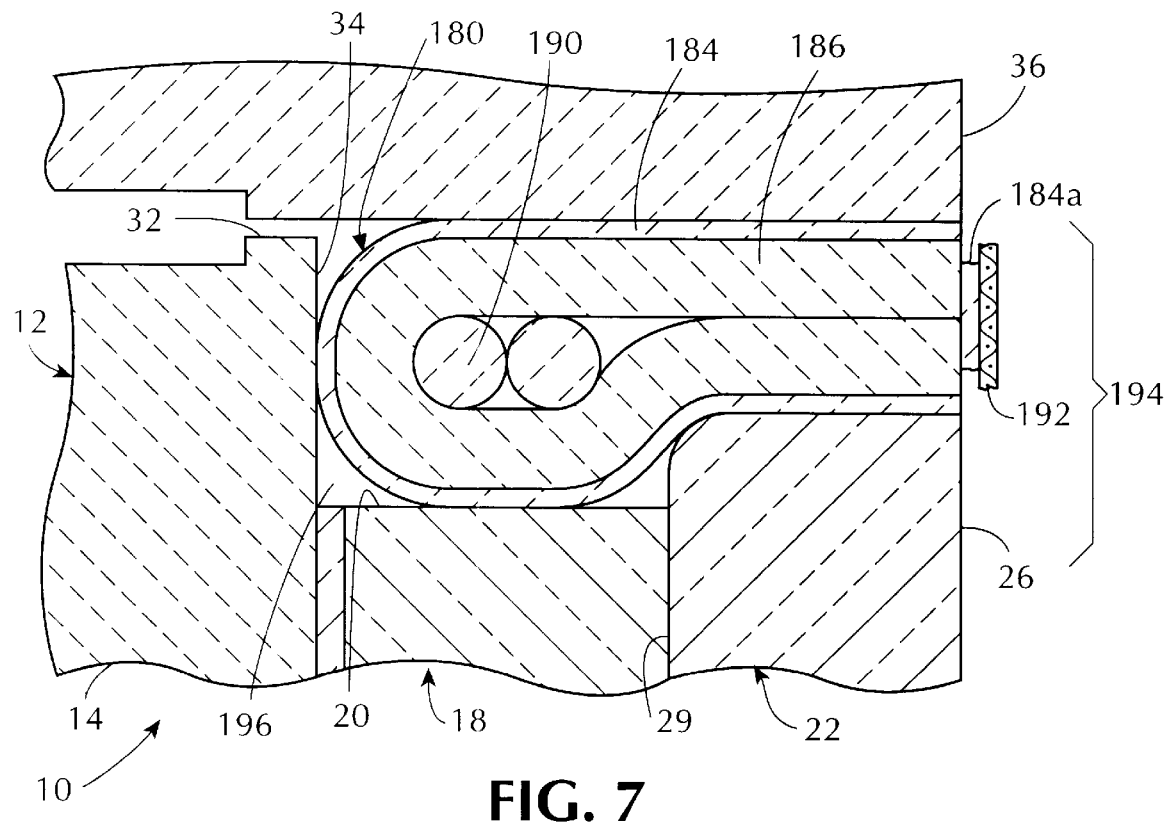
FIG. 7 is an enlarged fragmentary sectional view of another embodiment of the invention.

A preferred embodiment of the expansion gap assembly is generally indicated by the reference number 180 in FIG. 7. The expansion gap assembly 180 is also formed of eight sectors of an annulus of compressible refractory insulating material geometrically similar to the sectors 44-58. Each of the sectors of the expansion gap assembly 180 include an outside layer 184 of ceramic paper or ceramic cloth, approximately 6 millimeters thick and approximately the same general dimensions as the outside layer 66. Each of the sectors of the expansion gap assembly 180 also include an inside layer 186 formed of the same material as the outside layer 66 and approximately the same general size as the inside layer 68 of the expansion gap assembly 42.

The ceramic paper and ceramic cloth of the outside layer 184 can, for example, be of the type sold by the Carborundum Co. under the designation Fiberfrax®. Since ceramic paper and ceramic cloth are commercially available in relatively thin gauges more than one layer of ceramic paper and ceramic cloth can be used as desired to form the desired thickness of the outside layer 184.

A coil of refractory rope 190 similar to the refractory rope 62, and of the same general cross-sectional diameter as the refractory rope 62, is sandwiched between the folded outside and inside layers 184 and 186 in a manner similar to that described for the expansion gap assembly 42. The coil of rope 190 is preferably one continuous length of rope that is wound into one, two or three substantially concentric coils depending on the width of the annular channel 196.

As a further option, the expansion gap assembly 180 (FIG. 7) can be fabricated into a unitary package by forming an annular sheath 184*a* (shown in fragmentary section) of the ceramic cloth layers 184 and stitching such layers together. Still another option is to encase the structure sheathed in ceramic cloth in another annular sheath 192 (FIG. 7) of high temperature metal alloys such as stainless steel mesh or Inconel® mesh (shown in fragmentary section) that can be further stitched with Inconel® wire, for example, to the annular sheath of ceramic cloth 184*a*. Preferably any sheath structure would not extend beyond the hot face 26 of the hot face brick 22. The partially shown annular sheath portions 184*a* and 192 of FIG. 7 are shown to extend beyond the hot face 26 for purposes of illustrative simplicity only. The high temperature metal alloy sheath 192 can, for example, be formed of type 316 standard grade 4×4 stainless steel mesh (wire cloth) sold by McMaster Carr or an equivalent Inconel® mesh.

The expansion gap assembly 180 with or without the high temperature metal alloy sheath 192 is disposed in an expansion gap 194 having an annular channel 196 that is approximately the same recess depth as that of the channel 30 and a width of approximately 100 to 125 millimeters as measured from the back surface 29 of the hot face brick 22 to the interior surface 34 of gasifier shell 12.

Figure 8:
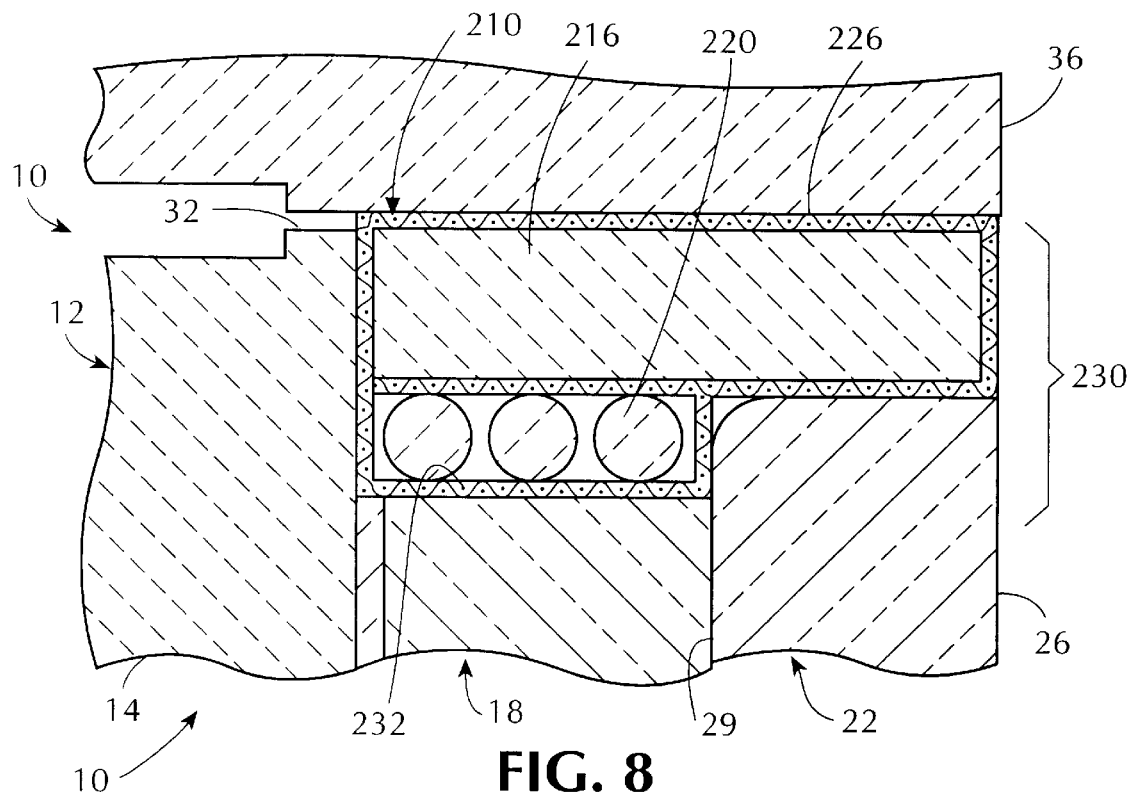
FIG. 8 is an enlarged fragmentary sectional view of still another embodiment of the invention.

Another embodiment of an expansion gap assembly is generally indicated by the reference number 210 in FIG. 8. The expansion gap assembly 210 includes one or more one piece layers 216 of annular compressible refractory material formed of the same material as the outer layer 66 of the expansion gap assembly 42. The layer 216 is disposed on a continuous coil of refractory rope 220 similar to the coil 62 but wound into three substantially concentric coils. The refractory layer 216 and the coil of refractory rope 220 are wrapped in ceramic cloth, the entire package of which is wrapped in a sheath of high temperature metal alloy mesh 226 similar to the mesh 192 such that the expansion gap assembly 210 is a single integral package unit. If desired ceramic cloth mesh, without metal mesh, can be applied over the refractory rope 220.

Although not shown, a high temperature metal alloy wire can be used to stitch through the layer 216 and the sheath 226 to enhance the package unit integrity of the expansion gap assembly 210.

The overall uncompressed thickness of the refractory layer 216 can be approximately 75 millimeters and the cross-sectional diameter of the refractory rope 220 can be approximately 25 millimeters.

The expansion gap assembly 210 is disposed in an expansion gap 230 having an annular channel 232 that is approximately the same depth as the annular channel 30 and a width of approximately 85 millimeters as measured from the back surface 29 of the hot face brick 22 to the inner surface 34 of the gasifier shell 12.

Some advantages of the invention evident from the foregoing description include an expansion gap assembly that is anchored in an expansion gap of a gasifier in a manner that prevents vacuum pullout of the expansion gap assembly from its protective position. A further advantage is that the expansion gap assembly includes a relatively incompressible bulge portion that can be locked into an annular channel of the gasifier to prevent vacuum pullout of the expansion gap assembly. Still another advantage is that the compressible refractory insulating material of the expansion gap assembly can be composed of a plurality of sectors of an annulus wrapped around a coil of rope to facilitate on-site creation of the expansion gap assembly. Another advantage is that the expansion gap assembly can be formed with an annular sheath to constitute an integral package unit that can be stocked for later use.

A further advantage of the invention is that it is adaptable to structures other than gasifiers such as any vertically oriented refractory lined vessel with a top opening through which or near which pass high velocity gases, liquids or slurries. The invention thus provides secure protection against overheating failure in spaces at a refractory lining that have dimensional variations due to temperature changes.

In view of the above it will be seen that the several objects of the invention are achieved and other advantageous results attained. As various changes can be made in the above constructions and methods without departing from the scope of the invention, it is intended that all matter contained in the above description or shown in the accompanying drawings shall be interpreted as illustrative and not in a limiting sense.

What is claimed is:

1. A self-anchoring refractory expansion gap assembly comprising,
   a) a substantially annular thermal insulating structure formed of compressible refractory material, said annular insulating structure having an inner periphery, an outer periphery, a first predetermined axial thickness when the insulating structure is uncompressed, and a second reduced axial thickness when the insulating structure is compressed a predetermined amount in an axial direction, and
   b) a coil of rope formed of relatively incompressible refractory material positioned proximate the outer periphery of the annular insulating structure such that the coil of rope is within the outer periphery of the annular insulating structure, whereby said coil of rope and said annular insulating structure can receive an axial force such that said coil of rope is directed axially into an annular channel of an expansion gap with said annular insulating structure to lock the annular insulating structure and the coil of rope into the annular channel and thereby prevent vacuum pullout of the expansion gap assembly from the expansion gap.

2. The expansion gap assembly as claimed in claim 1, wherein said annular insulating structure includes a plurality of layers of compressible refractory material.

3. The expansion gap assembly as claimed in claim 2, wherein said annular insulating structure includes an outer sandwiching layer and an inner sandwiching layer disposed between the outer sandwiching layer, said outer sandwiching layer being selected from the group consisting of ceramic paper and ceramic cloth.

4. The expansion gap assembly as claimed in claim 3, including a substantially annular sheath of high temperature metal alloy mesh around the substantially annular insulating structure to form an integral package.

5. The expansion gap assembly as claimed in claim 3, wherein the outer sandwiching layer and the inner sandwiching layer have respective peripheral circular fold portions provided at the outer periphery of the annular insulating structure and the coil of rope is positioned within the peripheral folded portion of the inner sandwiching layer such that the coil of rope is sandwiched between the inner and outer sandwiching layers of said annular insulating structure.

6. The expansion gap assembly as claimed in claim 1, wherein the annular insulating structure is composed of a plurality of substantially radial sectors of an annulus of substantially equal angle, each said sector being folded around respective portions of the coil of rope.

7. The expansion gap assembly as claimed in claim 6, wherein the annular insulating structure is composed of eight of said substantially radial sectors.

8. The expansion gap assembly as claimed in claim 6, wherein the insulating structure of each of said sectors includes an inside layer of compressible refractory material folded around a portion of the coil of rope and an outside layer surrounding the inside layer and the portion of rope.

9. The expansion gap assembly as claimed in claim 8, wherein the outside layer is selected from the group consisting of ceramic paper and ceramic cloth.

10. The expansion gap assembly as claimed in claim 9, including a substantially annular sheath of stainless steel mesh around the substantially annular insulating structure to form an integral package.

11. The expansion gap assembly as claimed in claim 1, wherein said coil of rope includes a plurality of substantially concentric coils.

12. The expansion gap assembly as claimed in claim 8, wherein the inside layer is formed of ceramic paper or cloth material and the outside layer is formed of ceramic fiber mat material.

13. The expansion gap assembly as claimed in claim 1 wherein the coil of rope is further from the inner periphery of the annular insulating structure than the outer periphery thereof.

14. A self-anchoring refractory expansion gap assembly comprising,
   a) a substantially annular insulating structure formed of compressible refractory material, said annular insulating structure having an inner periphery, an outer periphery, a first predetermined axial thickness when the insulating structure is uncompressed, and a second reduced axial thickness when the insulating structure is compressed a predetermined amount in an axial direction,
   b) a coil of rope formed of relatively incompressible refractory material positioned proximate the outer periphery of the annular insulating structure such that the coil of rope is within the outer periphery of the annular insulating structure, whereby said coil of rope and said annular insulating structure can receive an axial force such that said coil of rope is directed axially into an annular channel of an expansion gap with said annular insulating structure to lock the annular insulating structure and the coil of rope into the annular channel and thereby prevent vacuum pullout of the expansion gap assembly from the expansion gap,
   c) said annular insulating structure being composed of a plurality of substantially radial sectors of an annulus of substantially equal angle, each said sector being folded around respective portions of the coil of rope, and
   d) the insulating structure of each of said sectors including an inside layer of compressible refractory blanket material folded around a portion of the coil of rope and an outside layer surrounding the inside layer and the portion of rope, said outside layer being selected from the group consisting of compressible ceramic paper and compressible ceramic cloth.

15. The expansion gap assembly as claimed in claim 14, wherein the outside layer is ceramic cloth stitched together to form an annular sheath around the inside layer.

16. The expansion gap assembly as claimed in claim 15, including a substantially annular sheath of high temperature metal alloy mesh around the annular sheath of ceramic cloth.

17. The expansion gap assembly as claimed in claim 14, wherein said coil of rope includes a plurality of substantially concentric coils.

18. The expansion gap assembly as claimed in claim 14, wherein the annular insulating structure is composed of eight of said substantially radial sectors.

19. A self-anchoring refractory expansion gap assembly comprising,
   a) a substantially annular insulating structure,
   b) said annular insulating structure being formed of compressible refractory material with an inner periphery and an outer periphery, and having a first predetermined axial thickness when the annular insulating structure is uncompressed and a second reduced axial thickness when the annular insulating structure is compressed in an axial direction,
   c) said expansion gap assembly further including a coil of rope formed of relatively incompressible refractory material positioned proximate the outer periphery of the annular insulating structure such that the coil of rope is within the outer periphery of the annular insulating structure, said coil of rope having a cross sectional diameter that provides the annular insulating structure with a peripheral bulge in the axial direction when the insulating blanket is axially compressed, and
   d) said annular insulating structure including an inner layer of compressible refractory blanket material folded around a portion of the coil of rope and an outer layer of ceramic cloth folded around the inner layer.

20. A method of preventing vacuum pullout of an expansion gap assembly from an expansion gap comprising,
   a) providing an annular expansion gap for the refractory brick lining of a refractory lined vessel at an upper portion of the vessel and forming an annular channel at a top surface portion of the refractory brick lining,
   b) forming a self-anchoring refractory expansion gap assembly as claimed in claim 13 having an uncompressed thickness that is greater than the gap height of the annular expansion gap,
   c) positioning the expansion gap assembly such that the coil of rope is aligned with the annular channel in the refractory brick lining,
   d) positioning a cover member over the upper portion of the vessel to compress the expansion gap assembly and force the coil of rope into the annular channel whereby the expansion gap assembly is locked into position in the annular channel by the locking in of the peripheral bulge portion of the expansion gap assembly into the annular channel.

21. The method of claim 20 including wrapping the expansion gap assembly in a high temperature metal alloy sheath as claimed in claim 16.

* * * * *